US012304201B2

(12) United States Patent
Oguri

(10) Patent No.: US 12,304,201 B2
(45) Date of Patent: May 20, 2025

(54) DAMPER APPARATUS

(71) Applicant: Roland DG Corporation, Hamamatsu (JP)

(72) Inventor: Takayoshi Oguri, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 236 days.

(21) Appl. No.: 18/125,157

(22) Filed: Mar. 23, 2023

(65) Prior Publication Data

US 2023/0330987 A1 Oct. 19, 2023

(30) Foreign Application Priority Data

Apr. 13, 2022 (JP) ................................ 2022-066472

(51) Int. Cl.
*B41J 2/05* (2006.01)
*B41J 2/045* (2006.01)
*B41J 2/055* (2006.01)
*B41J 2/175* (2006.01)

(52) U.S. Cl.
CPC .......... *B41J 2/055* (2013.01); *B41J 2/04501* (2013.01); *B41J 2/175* (2013.01)

(58) Field of Classification Search
CPC .... B41J 2/055; B41J 2/04501; B41J 2/17563; B41J 2/17566; B41J 2/175; B41J 2/17513; B41J 2/17593; B41J 2/17596
See application file for complete search history.

(56) References Cited

U.S. PATENT DOCUMENTS

2010/0295905 A1 11/2010 Tamaki
2017/0225454 A1* 8/2017 Yoshida ............... B41J 2/17566
2023/0001694 A1* 1/2023 Sawada ................ B41J 2/16523
2023/0057227 A1* 2/2023 Seki ..................... B41J 2/14233

FOREIGN PATENT DOCUMENTS

JP 2012-171343 A 9/2012
JP 5348575 B2 11/2013

* cited by examiner

*Primary Examiner* — Kristal Feggins
(74) *Attorney, Agent, or Firm* — Keating & Bennett, LLP

(57) ABSTRACT

A damper apparatus includes a damper casing that is movable together with an ink head capable of discharging an ink from a nozzle and includes at least one reservoir chamber capable of reserving therein the ink to be supplied to the ink head and an opening in communication with the reservoir chamber, a damper film to close the opening and being elastically deformable in accordance with a reserved amount of the ink in the reservoir chamber, and at least one pressure detector detachably attached to an external surface of the damper casing to directly detect internal pressure of the reservoir chamber and generate a detection signal.

7 Claims, 14 Drawing Sheets

DAMPER APPARATUS

CROSS REFERENCE TO RELATED APPLICATIONS

This application claims the benefit of priority to Japanese Patent Application No. 2022-066472 filed on Apr. 13, 2022. The entire contents of this application are hereby incorporated herein by reference.

BACKGROUND OF THE INVENTION

1. Field of the Invention

The present disclosure relates to an improvement technology for a damper apparatus.

2. Description of the Related Art

A printer, a facsimile, a copying machine, and a multi-function image formation device that has functions thereof are each provided with a damper apparatus. The damper apparatus is operable to stabilize a discharging operation of an ink head that discharges an ink by easing a pressure change of an ink supplied to the ink head from an ink supply line. For example, Japan Patent No. 5348575 discloses a conventional technology regarding such a damper apparatus (see FIG. 7 and FIG. 15).

A damper apparatus disclosed in Japan Patent No. 5348575 includes a reservoir chamber that reserves therein an ink to be supplied to an ink head, a damper film which closes an opening formed in a side surface of the reservoir chamber, and which is elastically deformable in accordance with the ink remaining amount in the reservoir chamber, and a float-type liquid level detecting sensor that detects the ink remaining amount in the reservoir chamber.

SUMMARY OF THE INVENTION

When, however, the damper film elastically deforms in accordance with the reserved amount of the ink within the reservoir chamber, since adverse effects, such as a deformation by the ink, and a dimension change in the reservoir chamber itself act on the damper film, it is difficult to execute a highly precise measurement. Moreover, there are also adverse effects originating from the dimension precision of the reservoir chamber itself, and the dimension precision of a component within the reservoir chamber.

Preferred embodiments of the present invention provide damper apparatuses each capable of highly precisely detecting an ink remaining amount in the reservoir chamber.

According to an example embodiment of the present disclosure, a damper apparatus includes a damper casing movable together with an ink head capable of discharging an ink from a nozzle, including at least one reservoir chamber capable of reserving therein the ink to be supplied to the ink head and an opening in communication with the reservoir chamber; a damper film to close the opening and to elastically deform in accordance with a reserved amount of the ink in the reservoir chamber; and at least one pressure detector detachably attached to an external surface of the damper to directly detect internal pressure of the reservoir chamber and generate a detection signal.

According to preferred embodiments of the present disclosure, damper apparatuses are capable of highly precisely detecting pressure in a reservoir chamber and an ink remaining amount in the reservoir chamber.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present disclosure will be described below with reference to the accompanying figures. Note that the preferred embodiments illustrated in the accompanying figures are merely examples of the present disclosure, and the present disclosure is not limited to such preferred embodiments. In the following description, terms right and left mean a right side and a left side with reference to the widthwise direction of a medium, and terms front and rear mean a front side and a rear side with reference to the feeding direction of the medium. Moreover, in the figures, Fr, Rr, Le, Ri, Up and Dn indicate front, rear, left, right, up and down, respectively.

First Preferred Embodiment

A damper apparatus 40 according to a first preferred embodiment and an image formation device 10 that includes the damper apparatus 40 will be described with reference to FIGS. 1 to 11.

Figure 1:
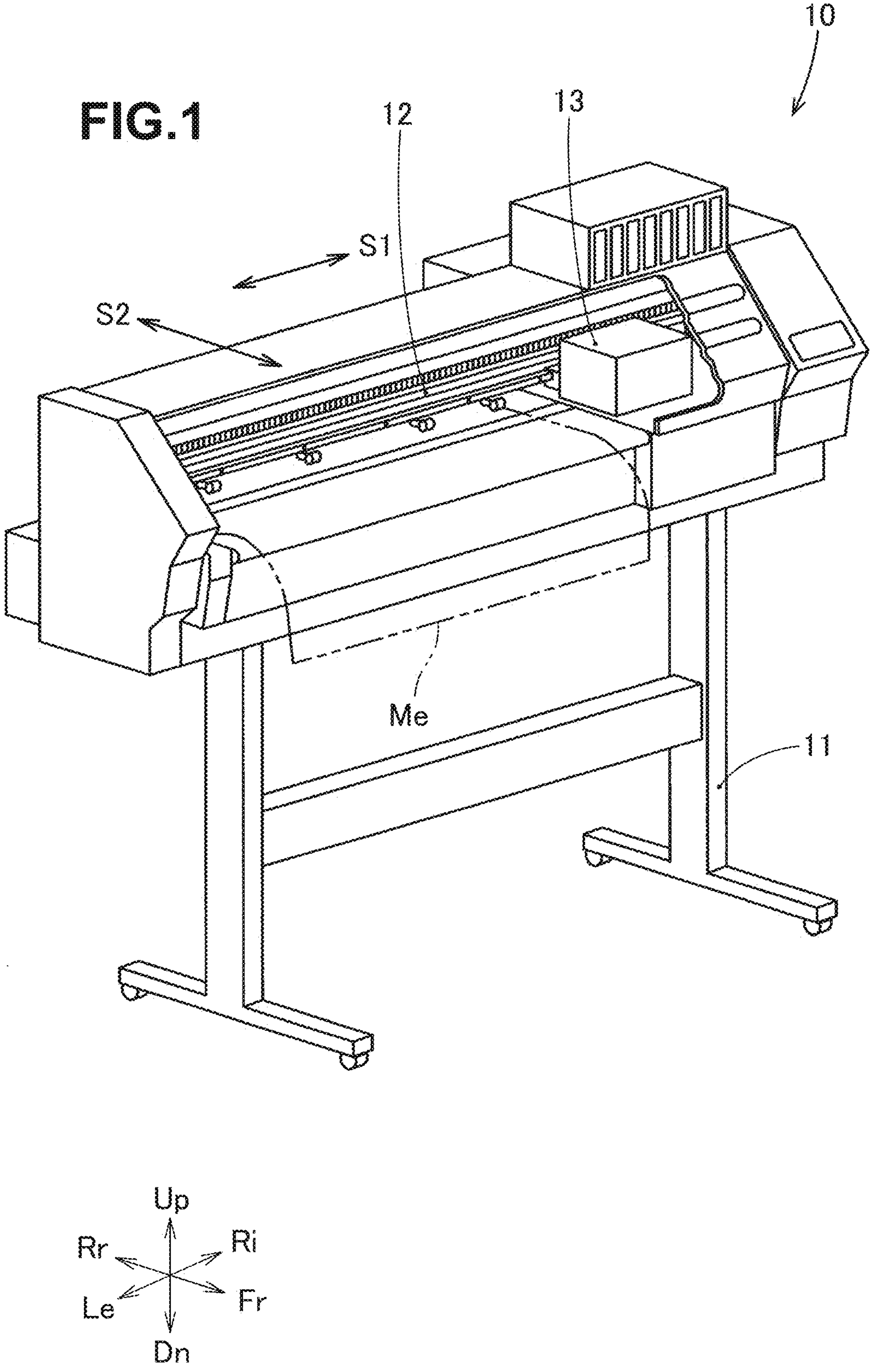
FIG. 1 is a perspective view of an image formation device that includes a damper apparatus according to a first preferred embodiment of the present invention.

As illustrated in FIG. 1, the image formation device 10 includes an inkjet printer structure capable of forming a color image on a medium Me. The image formation device 10 can print large-size advertising display and poster, etc.

A widthwise direction S1 of the medium Me with reference to a feeding direction S2 of the medium Me fed by the unillustrated carrying device of the image formation device 10 will be referred to as a "main scanning direction S1" in some cases. Moreover, the feeding direction S2 of the medium Me will be also referred to as a "sub scanning direction S2" in some cases. The sub scanning direction S2 is an orthogonal direction to the main scanning direction S1 with the image formation device 10 being viewed from the top.

The medium Me subjected to printing is, for example, a roll medium that is wound around a roll. The material of the medium Me may be paper like regular paper, resin, such as polyvinyl chloride resin and polyester resin, and metal, such as an aluminum material and an iron material, and it can be formed of various materials.

Figure 2:
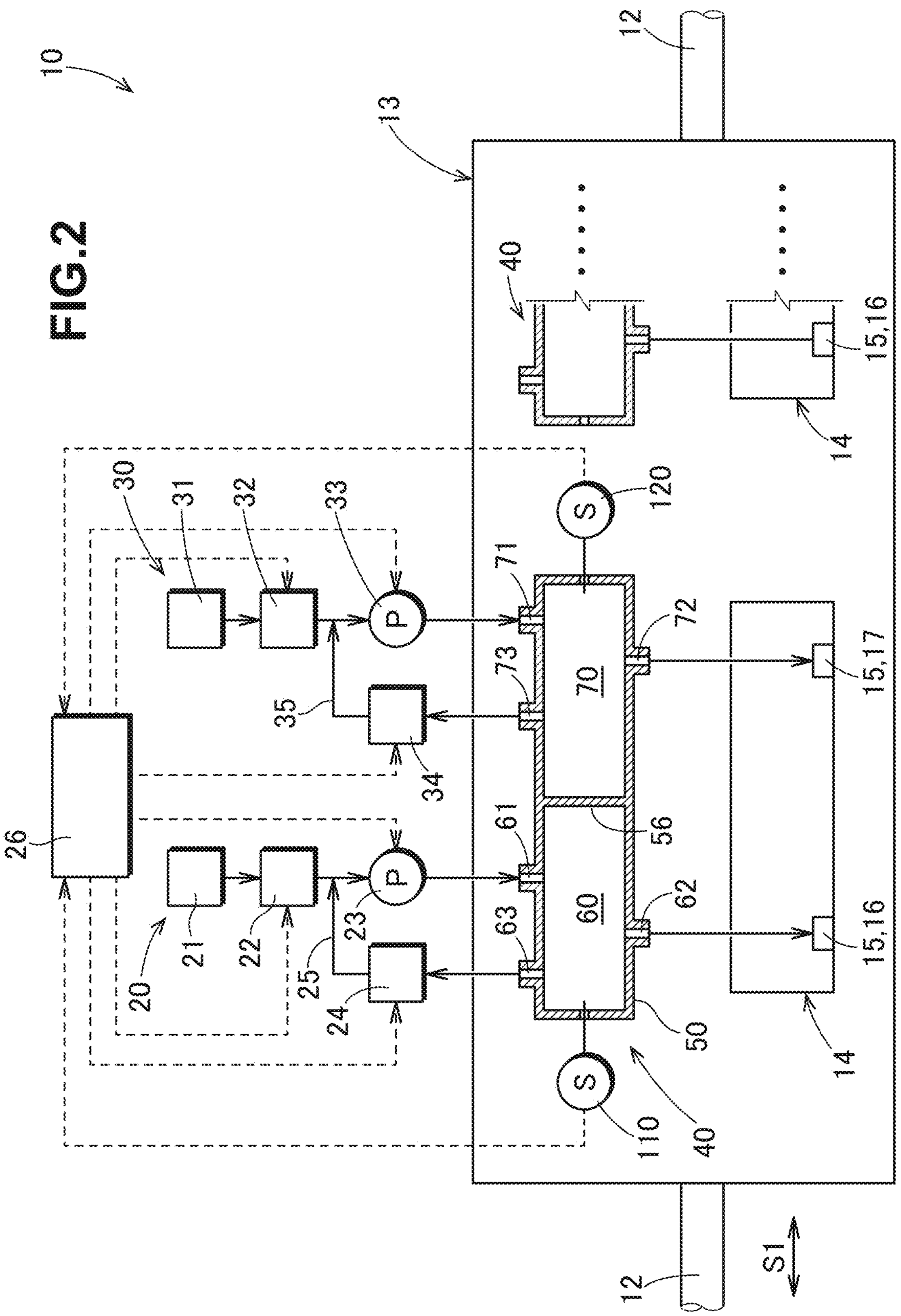
FIG. 2 is an example diagram of a carriage and of an ink supply system according to the first preferred embodiment of the present invention.

As illustrated in FIGS. 1 and 2, the image formation device 10 includes a rail 12 extended in the main scanning direction S1 relative to a stand 11, a carriage 13 provided on the rail 12 so as to be movable in the main scanning direction S1, a plurality of ink heads 14 (printing heads 14) and the plurality of damper apparatuses 40 both provided on the carriage 13. When the carriage 13 moves in the main scanning direction S1, the plurality of ink heads 14 and the plurality of damper apparatuses 40 also move in the main scanning direction S1.

As illustrated in FIG. 2, each ink head 14 includes a plurality of nozzles 15 each capable of discharging a droplet of various inks. The plurality of nozzles 15 is arranged side by side in the main scanning direction S1, and also in the sub scanning direction S2 (see FIG. 1). One of the nozzle groups 16 that includes the plurality of nozzles 15 arranged side by side in the sub scanning direction S2 relative to the ink heads 14 will be referred to as a "first nozzle group 16", and another group 17 will be referred to as a "second nozzle group 17".

As illustrated in FIG. 2, the one damper apparatus 40 corresponds to the one ink head 14. The damper apparatus 40 is to ease a pressure change of the ink so as to stabilize the ink discharge operation from the plurality of nozzles 15. The damper apparatus 40 includes one damper casing 50. The damper casing 50 is provided with two reservoir chambers 60 and 70. That is, the damper casing 50 has the interior divided into two spaces by a vertical plate-shape dividing wall 56 in the horizontal direction, thus having the two reservoir chambers 60 and 70. The one chamber 60 in the two reservoir chambers 60 and 70 will be referred to as a "first reservoir chamber 60", and another chamber 70 will be referred to as a "second reservoir chamber 70".

An ink is supplied to each nozzle 15 of the first nozzle group 16 from a first ink supply system 20. The first ink supply system 20 includes a first ink tank 21 that can reserve therein the ink, a first supply control valve 22 that has an inlet opening connected to the supply opening of the first ink tank 21, a first supply pump 23 that has a suction opening connected to the outlet opening of the first supply control valve 22, the first reservoir chamber 60 that has an inflow opening 61 connected to the discharge opening of the first supply pump 23, each nozzle 15 of the first nozzle group 16 connected to the discharge opening 62 of the first reservoir chamber 60, and a first circulation path 25 connected to the suction opening of the first supply pump 23 through a first return control valve 24 from a return opening 63 of the first reservoir chamber 60. When the ink contains pigments with a large specific gravity, the first circulation path 25 causes the ink in the first reservoir chamber 60 to be circulated, thereby preventing the ink in the first reservoir chamber 60 from settling out.

The internal pressure of the first reservoir chamber 60 is to be detected by a first pressure detecting component 110. The first pressure detecting component 110 directly detects the internal pressure of the first reservoir chamber 60, and transmits an electrical detection signal to a control unit 26. The control unit 26 receives the detection signal from the first pressure detecting component 110, and calculates an ink remaining amount in the first reservoir chamber 60 relative to the internal pressure of the first reservoir chamber 60 by arithmetic processing, a conversion map, etc., thereby controlling the first supply control valve 22, the first supply pump 23, and the first return control valve 24.

The ink is supplied to each nozzle 15 of the second nozzle group 17 from a second ink supply system 30. The second ink supply system 30 includes a second ink tank 31 that can reserves therein the ink, a second supply control valve 32 that has an inlet opening connected to the supply opening of the second ink tank 31, a second supply pump 33 that has a suction opening connected to the outlet opening of the second supply control valve 32, a second reservoir chamber 70 that has an inflow opening 71 connected to the discharge opening of the second supply pump 33, each nozzle 15 of the second nozzle group 17 connected to the discharge opening 72 of the second reservoir chamber 70, and a second circulation path 35 connected to the suction opening of the second supply pump 33 through a second return control valve 34 from a return opening 73 of the second reservoir chamber 70. When the ink contains pigments with a large specific gravity, the second circulation path 35 causes the ink in the second reservoir chamber 70 to be circulated, thereby preventing the ink in the second reservoir chamber 70 from settling out.

The internal pressure of the second reservoir chamber 70 is to be detected by a second pressure detecting component 120. The second pressure detecting component 120 directly detects the internal pressure of the second reservoir chamber 70, and transmits an electrical detection signal to the control unit 26. The control unit 26 receives the detection signal from the second pressure detecting component 120, and calculates an ink remaining amount in the second reservoir chamber 70 relative to the internal pressure of the second reservoir chamber 70 by arithmetic processing, a conversion map, etc., thereby controlling the second supply control valve 32, the second supply pump 33, and the second return control valve 34.

Next, the damper apparatus 40 will be described in detail with reference to FIGS. 2 to 7. The damper apparatus 40 includes the one damper casing 50 and two covers 90 and 90.

Figure 5:
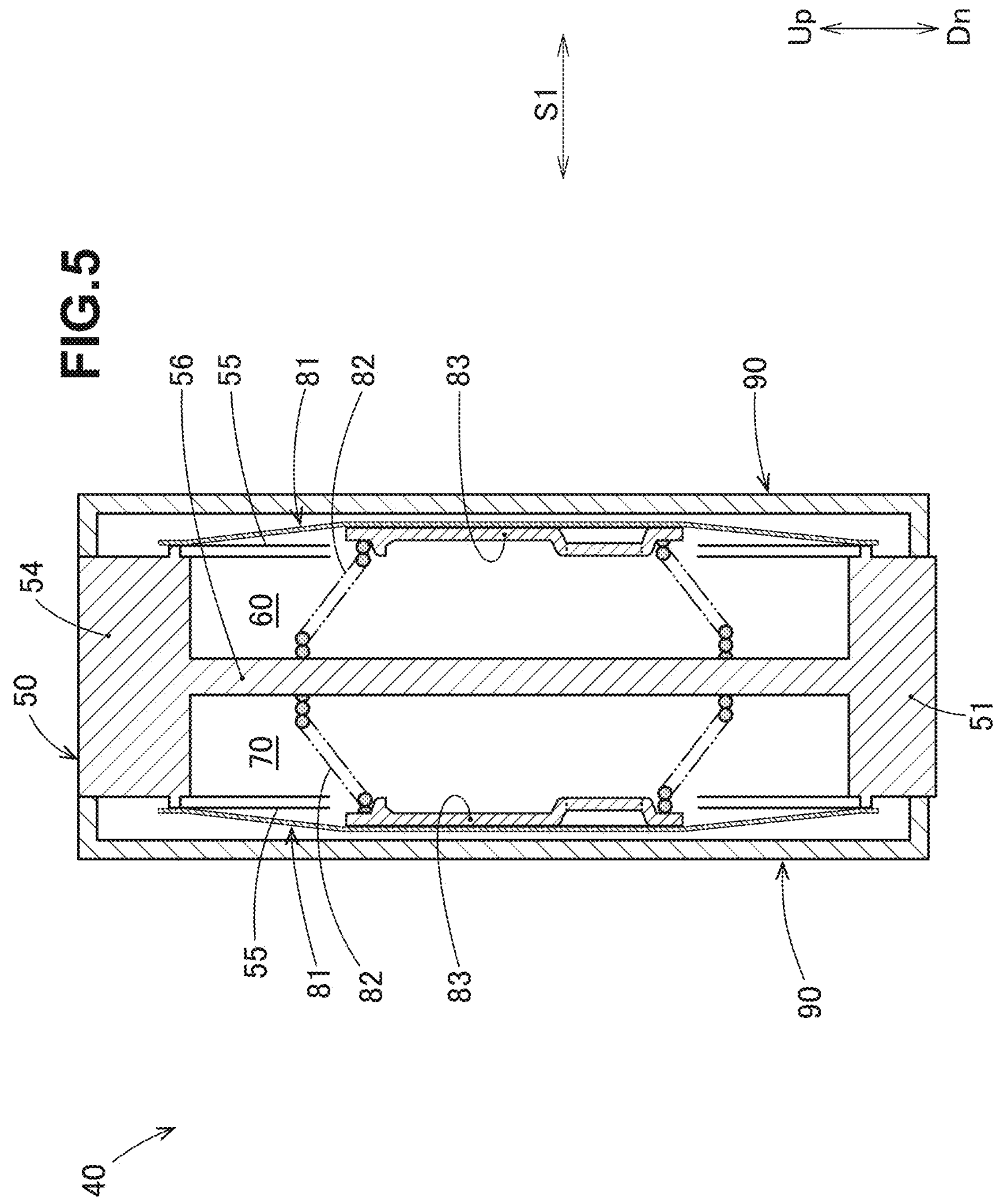
FIG. 5 is a cross-sectional view taken along a line 5-5 in FIG. 3.
Figure 6:
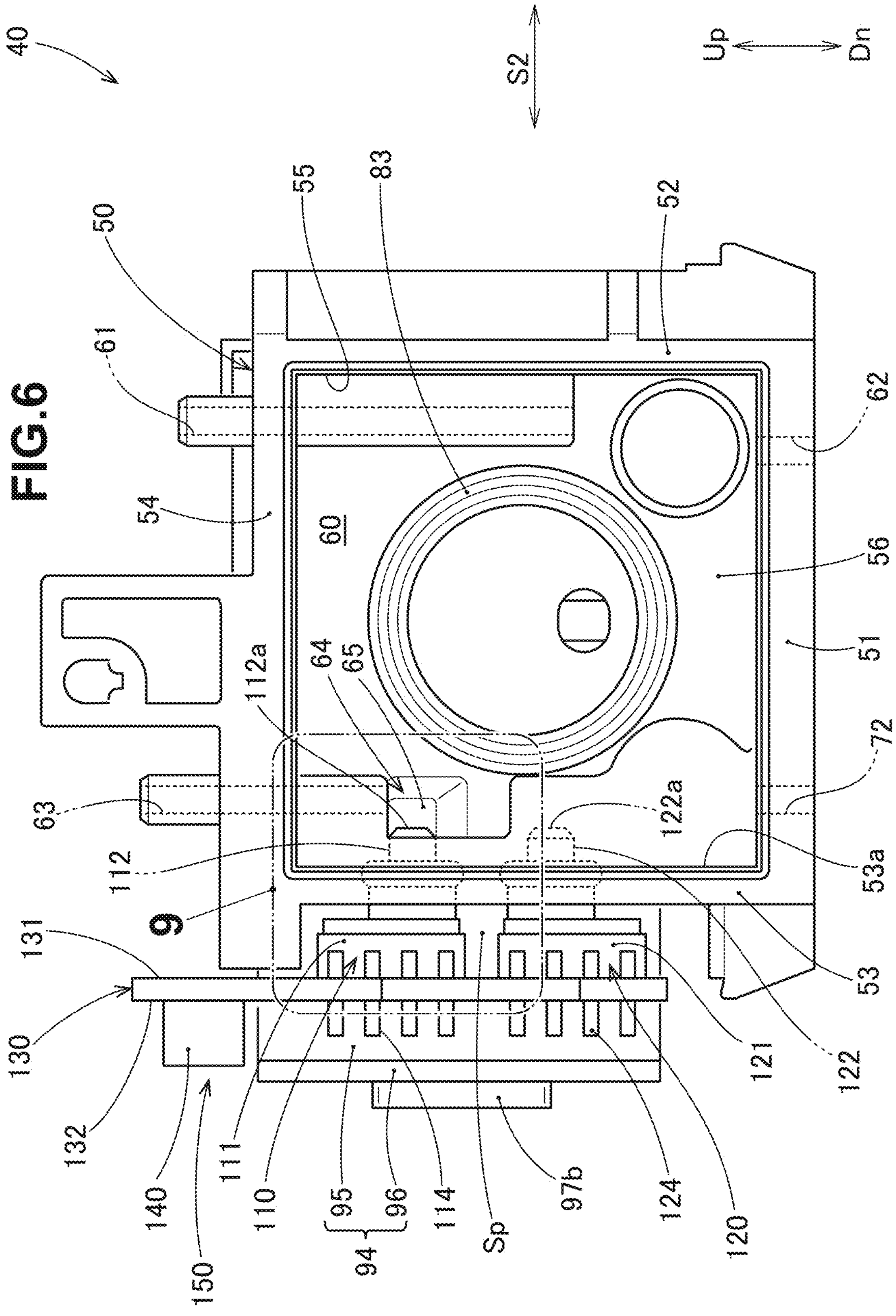
FIG. 6 is a side view with a damper film and a cover being removed from the damper apparatus illustrated in FIG. 4.

The damper casing 50 includes a structure with a rectangular or substantially rectangular shape in a planar view and in a rectangular or substantially rectangular shape in a side view, and is formed of a material like a resin which has a light blocking effect and which is non-transparent. As illustrated in FIG. 6, the damper casing 50 includes and integrated by a bottom plate 51 in a lateral-plate shape, a first side plate 52 which is in a vertical plate shape and which stands upright from the one end of the bottom plate 51 in the sub scanning direction S2, a second side plate 53 which is in a vertical plate shape and which stands upright from the other end of the bottom plate 51 in the sub scanning direction S2, and a top plate 54 which is in a lateral plate shape and which connects the respective upper ends of the first side plate 52 and the second side plate 53. Moreover, as illustrated in FIG. 5, the damper casing 50 is opened across the entire side plates 55 and 55 in the main scanning direction S1. In the following description, the opened side plates 55 and 55 in the main scanning direction S1 will be also referred to as "openings 55 and 55".

The above-described dividing wall 56 is integrated at the center between the openings 55 and 55 in the damper casing 50, thereby dividing the interior of the damper casing 50 into the first reservoir chamber 60 and the second reservoir chamber 70 in the main scanning direction S1.

Figure 3:
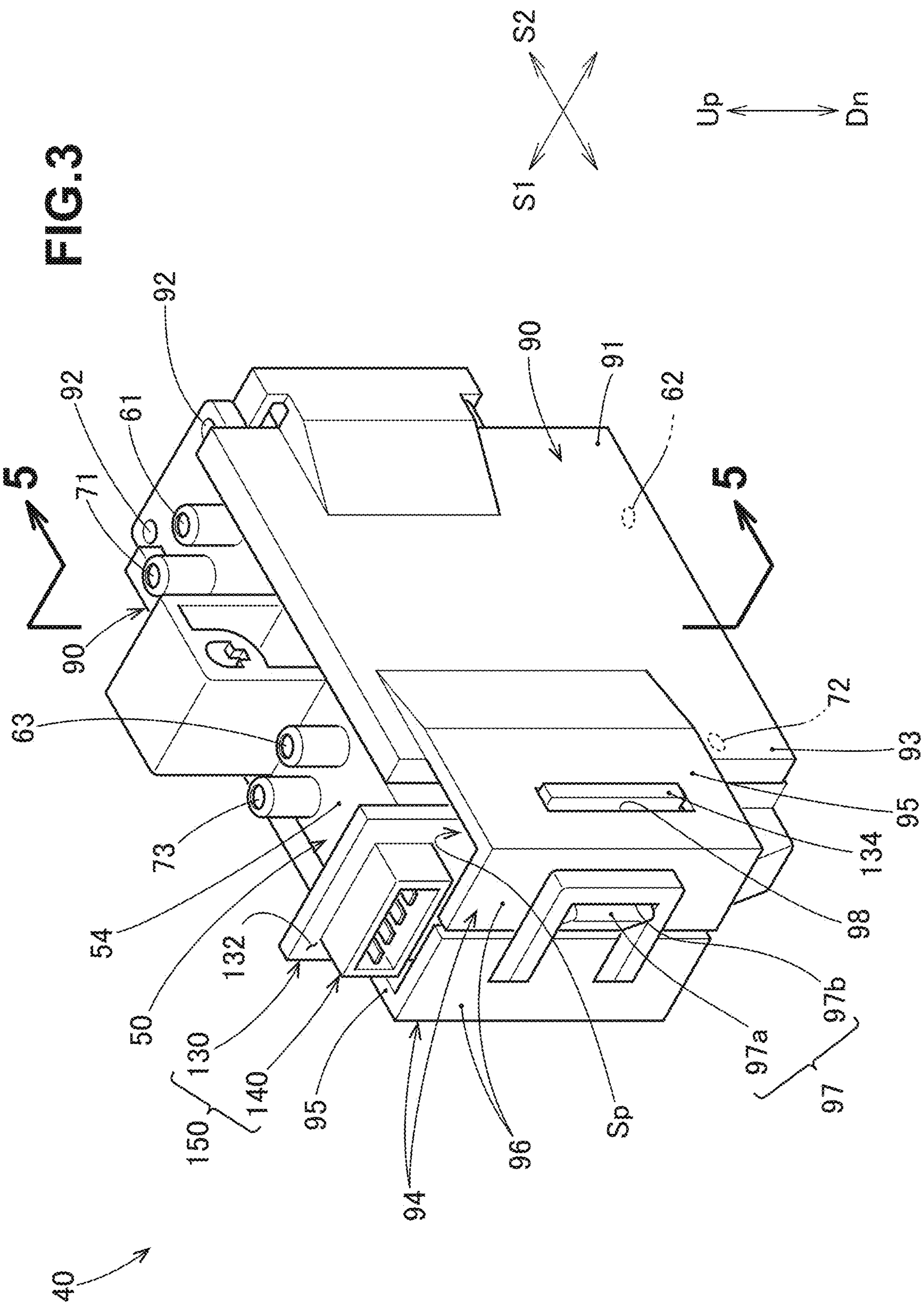
FIG. 3 is a perspective view of the damper apparatus illustrated in FIG. 2.

As illustrated in FIGS. 3 and 6, the inflow openings 61 and 71 of the respective reservoir chambers 60 and 70 are located near the first side plate 52, and extend to the nearby location to the bottom plate 51 from the top plate 54. The discharge openings 62 and 72 of the respective reservoir chambers 60 and 70 are located in the bottom plate 51. The return openings 63 and 73 of the respective reservoir chambers 60 and 70 are located near the second side plate 53, and are located near the top plate 54.

The above-description will be summarized as follows. As illustrated in FIG. 5, the two reservoir chambers 60 and 70 are spaces which are separated and independent from each other, and which have respective opposite sides opened. That is, the damper casing 50 has the openings 55 and 55 which are opened entirely in respective sides in the main scanning direction S1. The openings 55 and 55 are closed by respective damper films 81 and 81. Consequently, the two reservoir chambers 60 and 70 are sealed.

The damper films 81 and 81 are each formed of an elastically deformable sheet (including a film) in accordance with the ink reserved amount in each reservoir chamber 60 and 70, and with the pressure in each reservoir chamber 60 and 70. For example, it is preferable that the damper films 81 and 81 each should be formed of a transparent or semi-transparent resin material. The damper films 81 and 81 are attached to the damper casing 50 at tension that enables deflection of such films toward the internal side and external side of each reservoir chamber 60 and 70.

Figure 4:
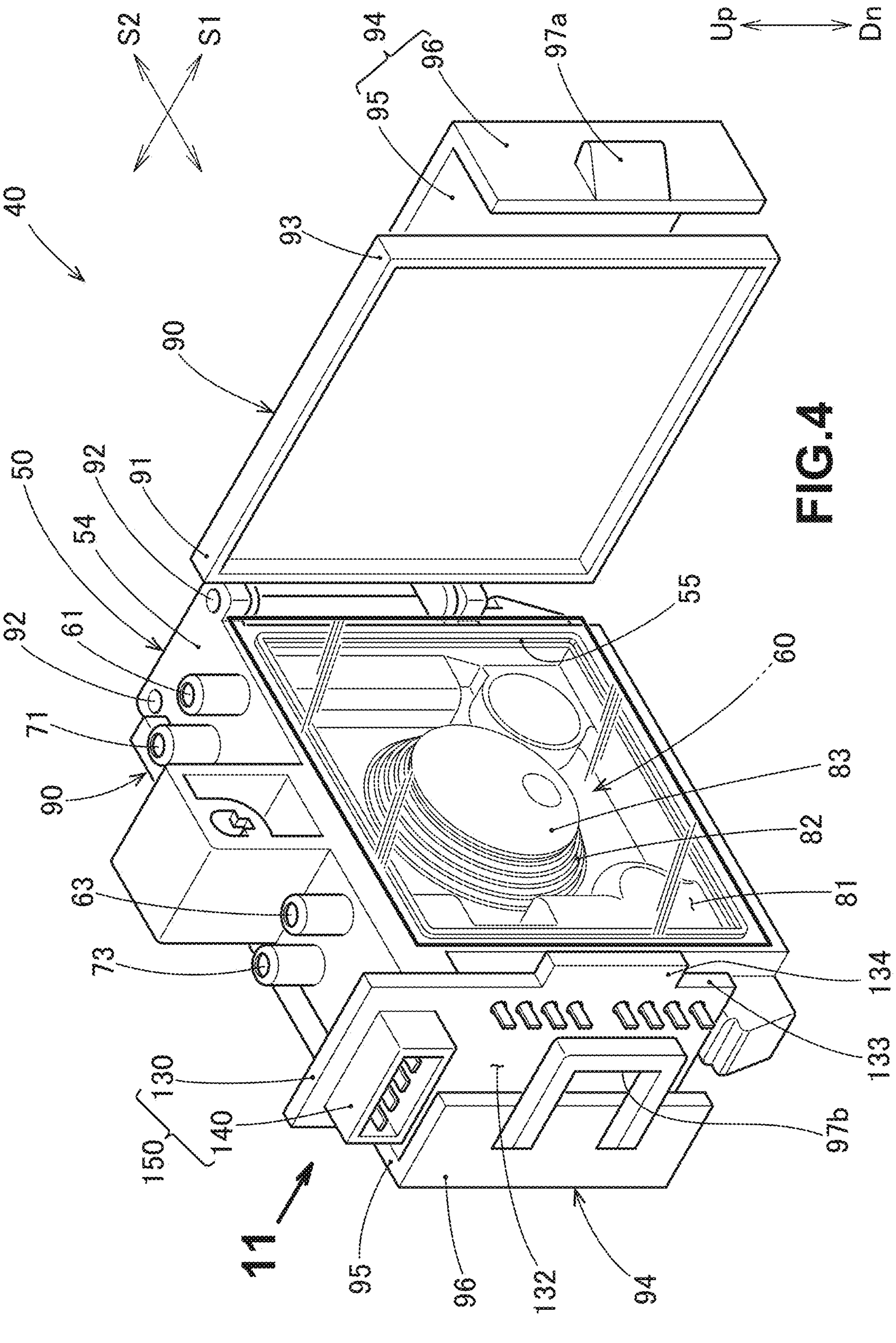
FIG. 4 is a perspective view in a state in which a cover of the damper apparatus illustrated in FIG. 3 is opened.

As illustrated in FIGS. 4 and 5, provided between the respective wall surfaces of the dividing wall 56 and the film surfaces (seat surfaces) of the respective damper films 81 and 81 are pushing members 82 and 82 which push the damper films 81 and 81 outwardly. Such pushing members 82 and 82 are each, for example, a compression coil spring. It is preferable that pushing components 83 and 83 in a plate shape should be provided between the respective damper films 81 and 81 and the pushing members 82 and 82.

As illustrated in FIGS. 3 to 5, the two covers 90 and 90 are each formed of a material like a resin which has a light blocking effect and which is non-transparent. These covers 90 and 90 close the respective openings 55 and 55 so as to cover the respective damper films 81 and 81 from the external side (the opposite side to the reservoir chambers 60 and 70) of the damper casing 50.

Base end portions 91 and 91 of the respective covers 90 and 90 at a side thereof are supported by respective hinge mechanisms 92 and 92 so as to be openable and closable in the main scanning direction S1. When the damper apparatus 40 is viewed from the top, these hinge mechanisms 92 and 92 are provided at corners of the damper casing 50 in the main scanning direction S1, e.g., the corners of the first side plate 52.

Figure 7:
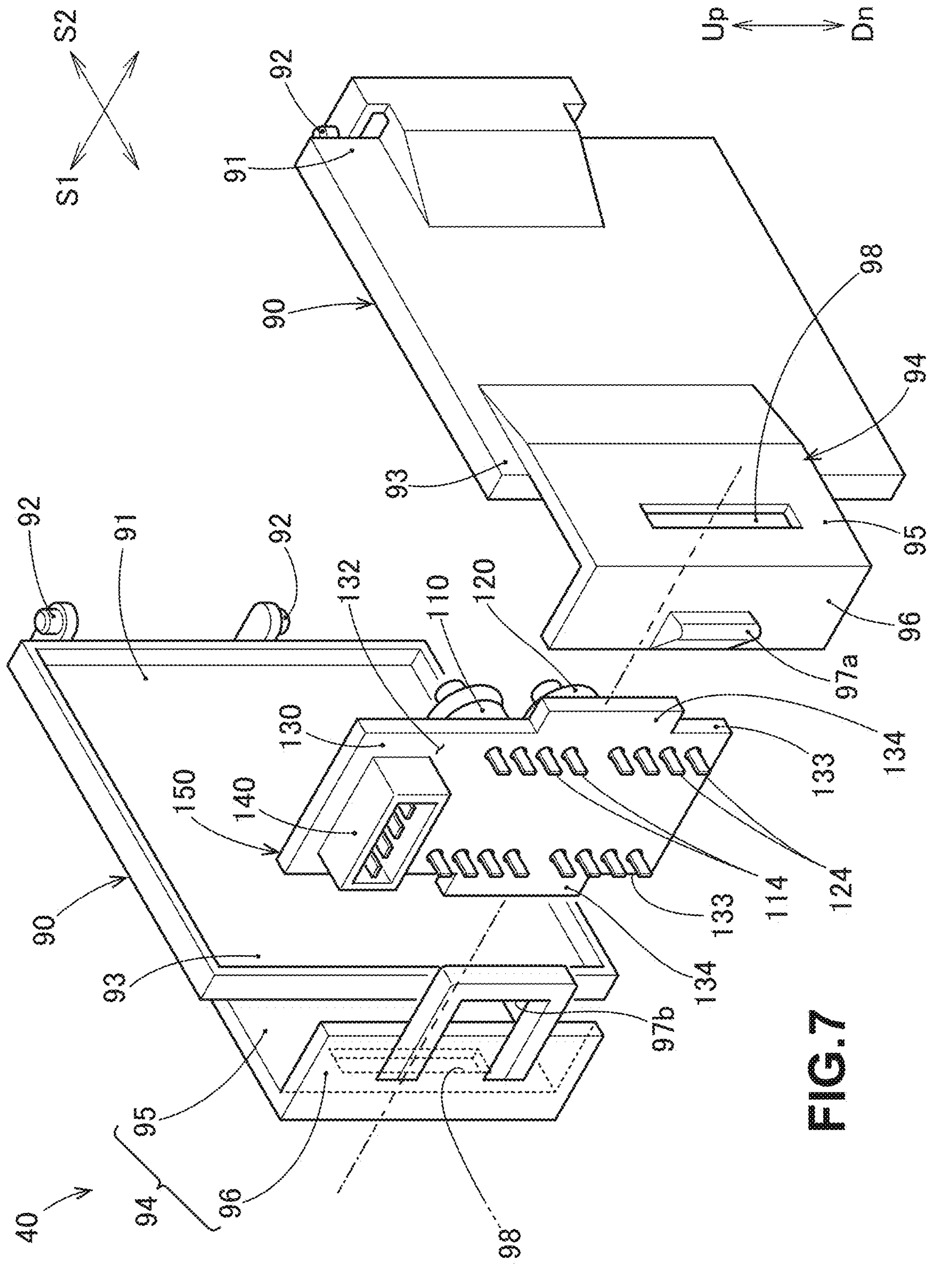
FIG. 7 is an exploded perspective view of the cover and a pressure detecting unit illustrated in FIG. 3.

As illustrated in FIGS. 3, 6, and 7, cover extended portions 94 and 94 which face with each other are integrated at opened end portions 93 and 93 of the respective covers 90 and 90. Each cover extended portion 94 and 94 is extended from each opened end portion 93 and 93 of each cover 90 and 90 to the opposite side to each hinge mechanism 92 and 92, and is formed in an L-shape in a planar view which face with each other.

More specifically, each cover extended portion 94 and 94 includes a first extended plate 95 and 95 in a vertical plate shape which extends from each opened end portion 93 and 93 of each cover 90 and 90 to the opposite side to the hinge mechanism 92 and 92, and a second extended plate 96 and 96 in a vertical plate shape which extends from each tip of each first extended plate 95 and 95 to a direction facing with each other.

The damper apparatus 40 includes a space Sp (see FIG. 6) surrounded by the second side plate 53 of the damper casing 50 and the respective cover extended portions 94 and 94. The space Sp will be also referred to as a "pressure detecting component placing space Sp". In order to form the pressure detecting component placing space Sp, provided between the external surface of the second side plate 53 of the damper casing 50 and the internal surfaces of the respective second extended plates 96 and 96 are respective certain preset clearances.

By causing the respective tips of the second extended plates 96 and 96 to abut with each other (including a structure substantially abut with each other), the openings 55 and 55 of the damper casing 50 can be closed and sealed, and the damper films 81 and 81 can be covered by the respective covers 90 and 90 (see FIG. 5).

As illustrated in FIGS. 3 and 7, the respective opened end portions 93 and 93 of the covers 90 and 90 are latched with each other by a latch mechanism 97 in a manner such that those can be unlatched from each other. The mechanism 97 includes, for example, a latch pawl 97*a* integrated with the one second extended plate 96, and the latch opening 97*b* integrated in the other second extended plate 96. By latching the latch pawl 97*a* in the latch opening 97*b*, those can be latched with each other.

Next, each pressure detecting component 110 and 120, and an attachment structure for each pressure detecting component 110 and 120 will be described in detail.

As illustrated in FIGS. 3, 6 to 8, the two pressure detecting components 110 and 120 are attached to the external surface of the damper casing 50 so as to be detachable. More specifically, the pressure detecting components 110 and 120 are attached to the damper casing 50 by the covers 90 and 90.

More specifically, the two pressure detecting components 110 and 120 are arranged on a straight line in the vertical direction of the damper casing 50, and are mounted on a first substrate surface 131 of a single substrate 130. A single connector 140 is mounted at the upper end portion or the lower end portion of a second substrate surface 132 (an opposite surface 132 to the first substrate surface 131) of the substrate 130. The two pressure detecting components 110 and 120 are electrically connected to the connector 140 through the substrate 130. Since the two pressure detecting components 110 and 120 and the connector 140 are mounted in a manner arranged on a straight line in the vertical direction, the substrate 130 is elongated in the vertical direction of the damper casing 50. As described above, a single pressure detecting unit 150 includes the two pressure detecting components 110 and 120, the single substrate 130, and the single connector 140.

This pressure detecting unit 150 is placed in the pressure detecting component placing space Sp, and has only the connector 140 exposed from the pressure detecting component placing space Sp. The first substrate surface 131 of the substrate 130 faces the external surface of the second side plate 53 of the damper casing 50.

Figure 8:
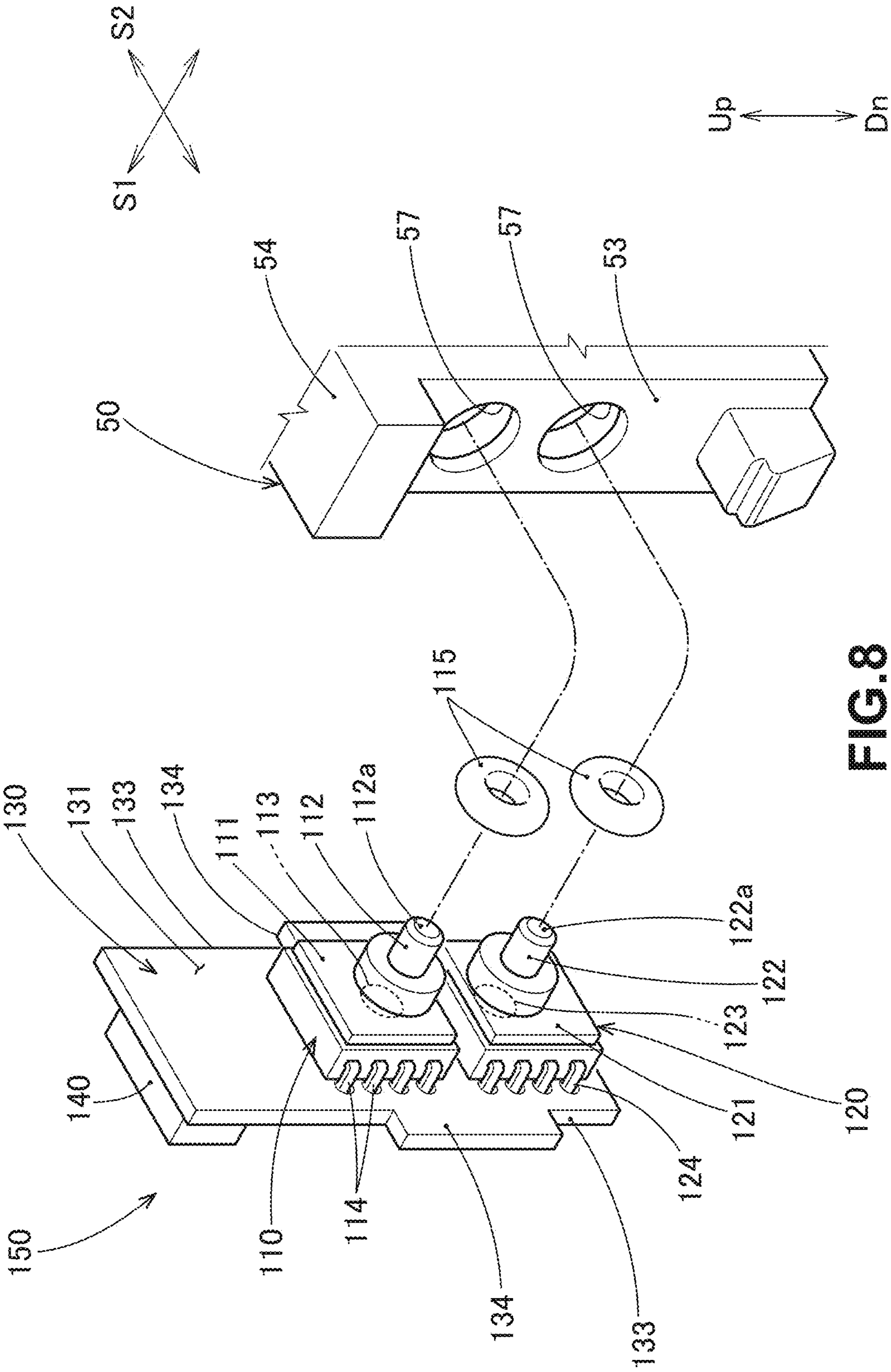
FIG. 8 is an exploded perspective of a damper casing and the pressure detecting unit illustrated in FIG. 3.

Furthermore, as illustrated in FIGS. 3, 6, and 8, the substrate 130 has two edges 133 and 133 that face the respective first extended plates 95 and 95 in a state in which both the covers 90 and 90 are closed. The edges 133 and 133 have respective fitting protrusions 134 and 134 protruding toward the respective first extended plates 95 and 95. Such fitting protrusions 134 and 134 can be fitted in respective fitting recesses 98 and 98 in the respective first extended plates 95 and 95. The fitting recesses 98 and 98 are each an opening passing completely through in the direction of the plate surface of each first extended plate 95 and 95, or are each a structure concaved in the direction of the plate surface. By fitting the fitting protrusions 134 and 134 in the respective fitting recesses 98 and 98, and closing both the covers 90 and 90 to latch the latch mechanism 97, the pressure detecting unit 150 is attached to the external surface of the damper casing 50 so as to be detachable.

As illustrated in FIG. 8, the pressure detecting components 110 and 120 are each, for example, a semiconductor pressure sensor. The pressure detecting components 110 and 120 each include a casing main component 111, 121, a nozzle 112, 122 in a pipe shape integrated with the corresponding casing main component 111, 121, a pressure sensor chip 113, 123 like a strain gage provided inside the corresponding casing main component 111, 121, and leads 114, 124 which extend from the corresponding pressure sensor chip 113, 123 toward the external side of the corresponding casing main component 111, 121, and are mounted on the substrate 130.

The pressure sensing surface of each of the pressure detecting components 110 and 120, i.e., the pressure sensing surface of each of the pressure sensor chips 113 and 123 is directed toward corresponding openings 112*a* and 122*a* (port holes 112*a* and 122*a*) of the corresponding nozzles 112 and 122. The pressure sensor chips 113, 123 output electric signals like voltage signals in accordance with pressure transmitted from the external side to the respective pressure sensing surfaces through the respective port holes 112*a* and 122*a*. Such electric signals are the detection signals of the respective pressure detecting components 110 and 120. Since the port holes 112*a* and 122*a* are directed in the same direction as those of the pressure sensing surfaces of the respective pressure sensor chips 113 and 123, the port holes 112*a* and 122*a* will be also referred to as "pressure sensing surfaces 112*a* and 122*a* of the respective pressure sensor chips 113 and 123".

The nozzles 112 and 122 of the respective pressure detecting components 110 and 120 are fitted in respective pressure detection holes 57 and 57 which are formed in the second side plate 53 of the damper casing 50. the space between each pressure detection hole 57 and 57, and, each nozzle 112 and 122 is sealed by each sealing member 115 and 125 like an O-ring.

As illustrated in FIG. 6, the port holes 112*a* and 122*a*, i.e., the pressure sensing surfaces 112*a* and 122*a* of the respective pressure detecting components 110 and 120 are perpendicular or substantially perpendicular to an internal surface 53*a* of the second side plate 53, and are in communication with the reservoir chambers 60 and 70, respectively (see FIG. 5). Hence, the pressure sensing surfaces 112*a* and 122*a* (the port holes 112*a* and 122*a*) of the respective pressure detecting components 110 and 120 are positioned perpendicularly or substantially perpendicularly to the moving direction S1 (the main scanning direction S1) of the damper casing 50. Furthermore, the pressure sensing surfaces 112*a* and 122*a* (the port holes 112*a* and 122*a*) of the respective pressure detecting components 110 and 120 are positioned in parallel or substantially in parallel with the gravity direction (the vertical direction) of the damper casing 50.

Figure 9:
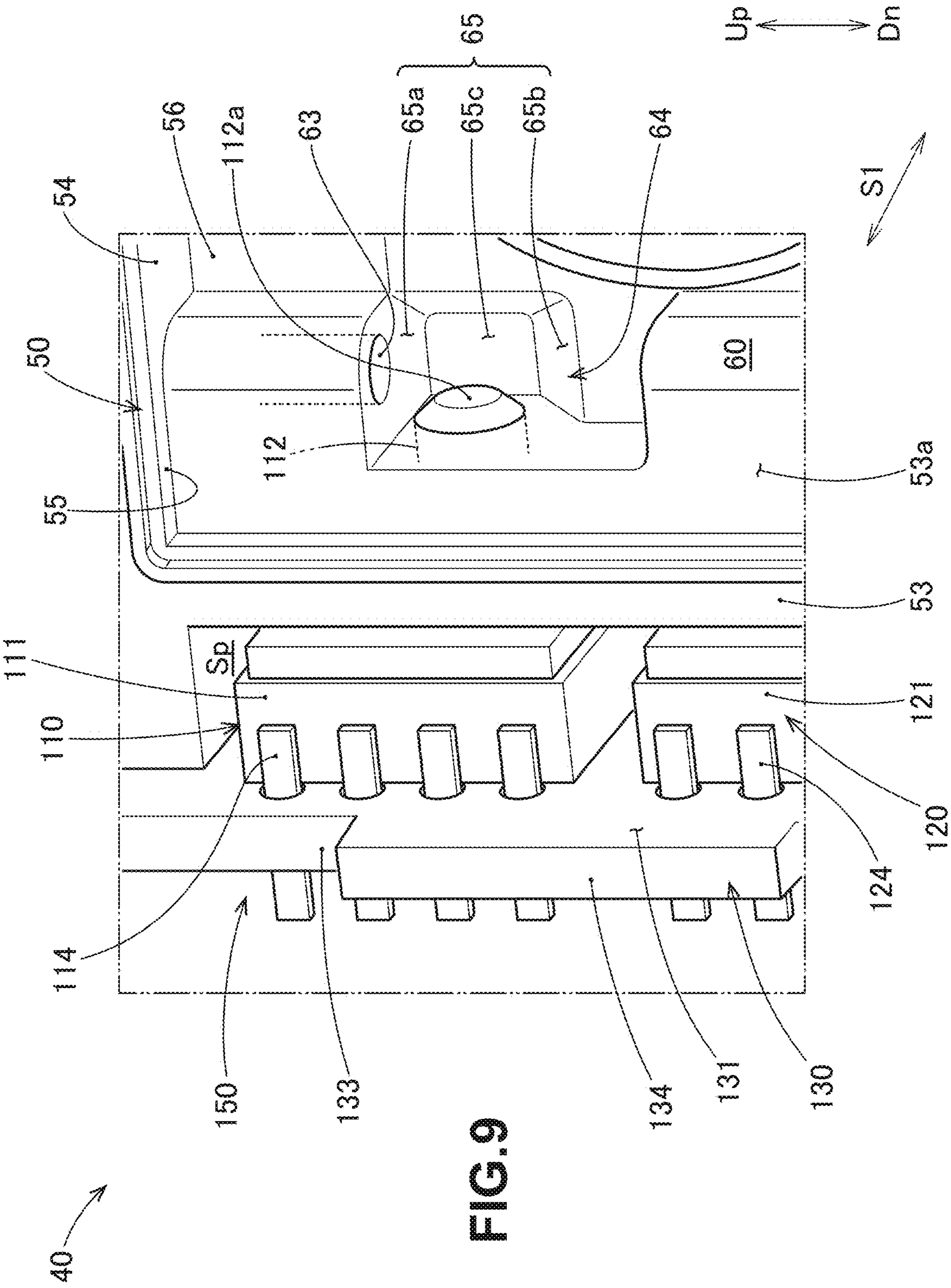
FIG. 9 is a perspective view with a portion 9 in FIG. 6 being enlarged.
Figure 10:
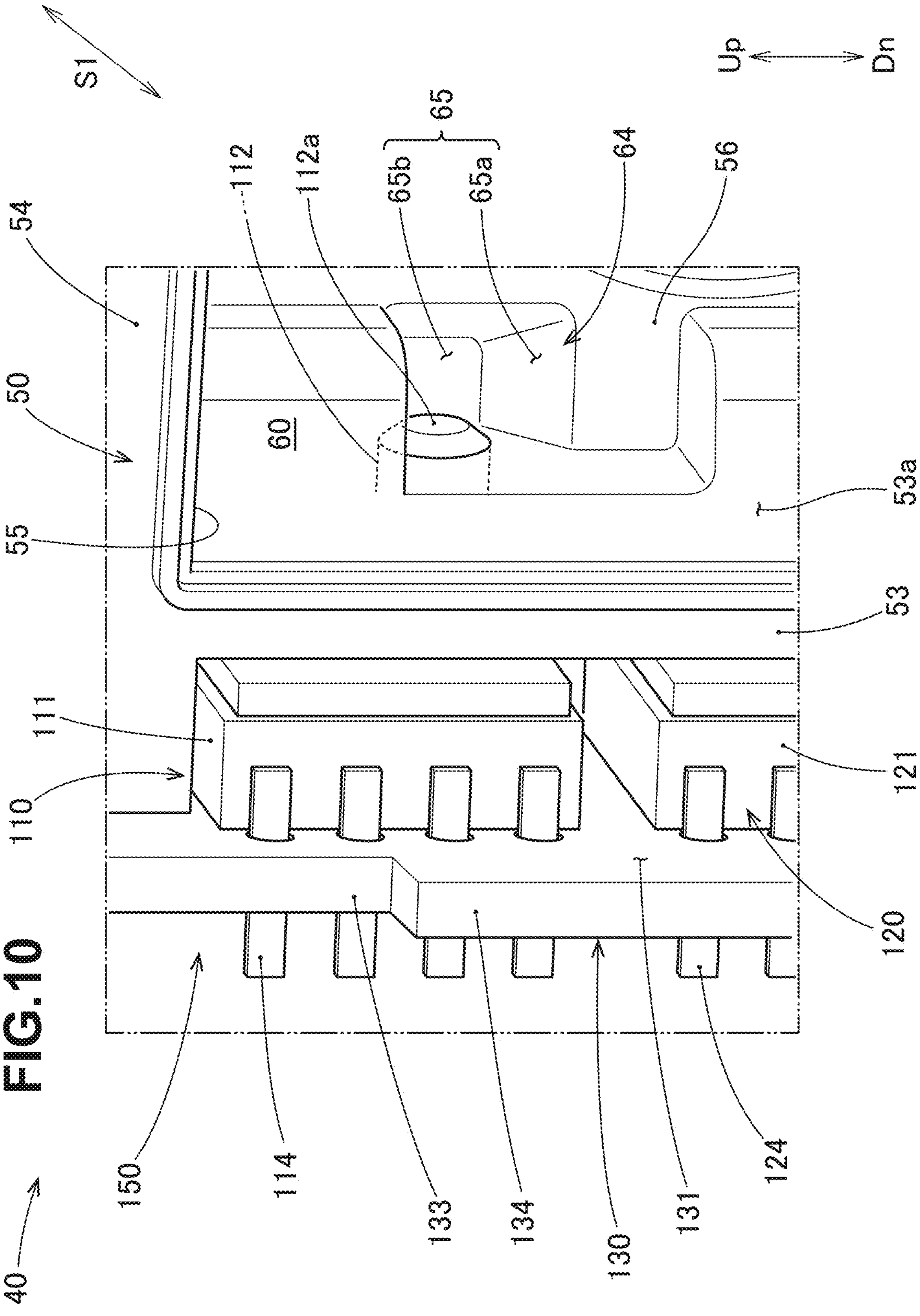
FIG. 10 is a perspective view of a relation between a first surrounding portion and a first detecting unit illustrated in FIG. 9 as viewed from the lower side.

As illustrated in FIGS. 9 and 10, the first reservoir chamber 60 includes a first surrounding portion 64 that surrounds the circumference of the port hole 112*a* of the first pressure detecting component 110. The first surrounding portion 64 includes the second side plate 53, and a first recess 65 concaved from the dividing wall 56. By providing the first recess 65 in the dividing wall 56, the port hole 122*a* of the first pressure detecting component 110 can be positioned at the center of the damper casing 50 in the widthwise direction (the center of the main scanning direction S1). The first recess 65 includes a portion of the dividing wall 56 expanded and projecting toward the second reservoir chamber 70 (see FIG. 5).

The return opening 63 of the first reservoir chamber 60 is in communication with an upper surface 65*a* of the first recess 65. A lower surface 65*b* of the first recess 65 is inclined downwardly from a depthwise surface 65*c* of the first recess 65 toward the first reservoir chamber 60. Depending on the type of the ink, constituents with a large specific gravity like metal constituents may be contained. Even if the ink which passes through the first recess 65 from the first reservoir chamber 60 and which flows into the return opening 63 is settled out, since the lower surface 65*b* of the first recess 65 is a surface inclined downwardly, a deposition on the lower surface 65*b* can be prevented. Accordingly, the port hole 112*a* is not clogged by the deposited ink.

Figure 11:
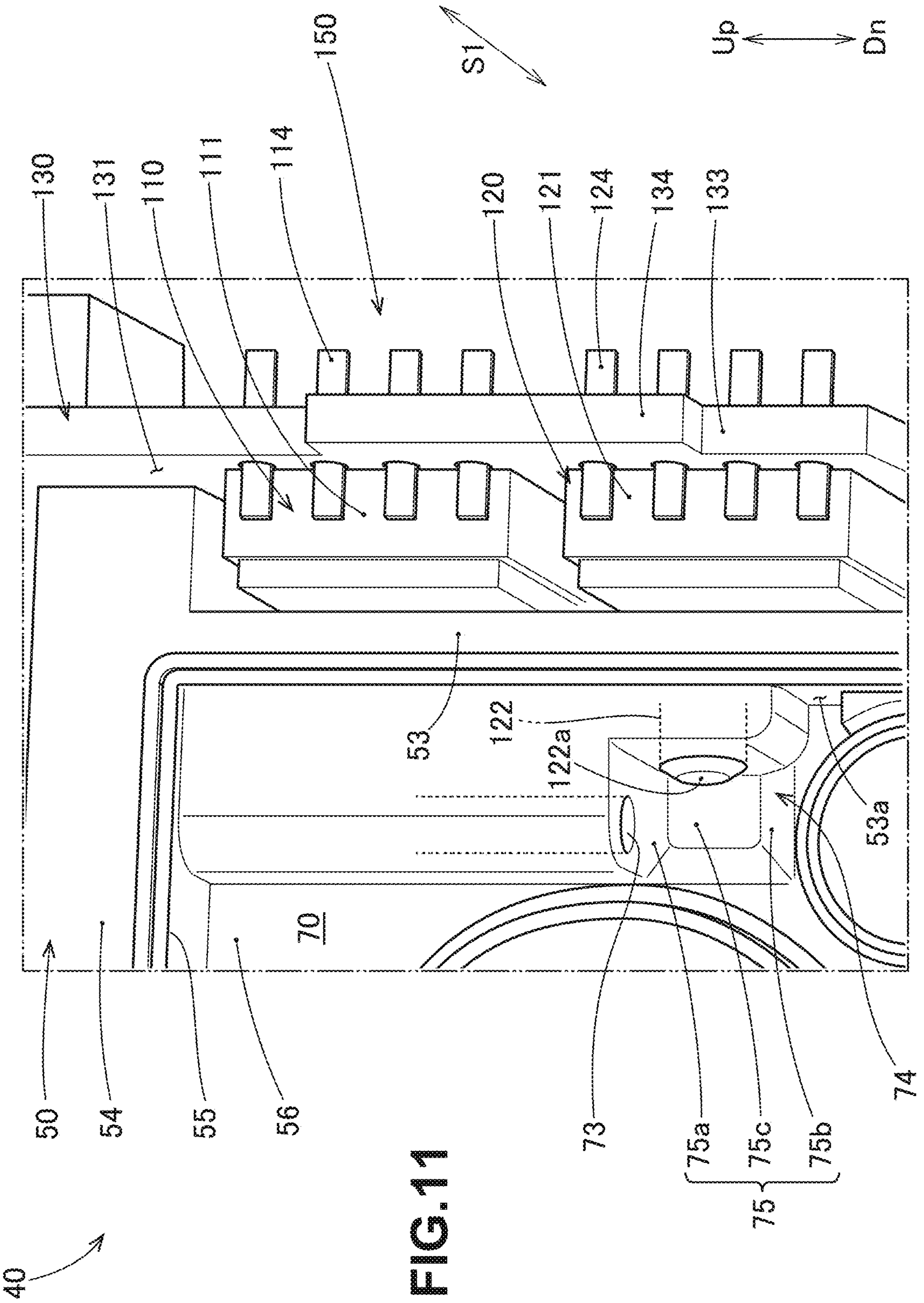
FIG. 11 is a perspective view of a relation between a second surrounding portion and a second pressure detecting component as viewed in a direction along an arrow 11 in FIG. 4.

As illustrated in FIG. 11, the second reservoir chamber 70 includes a second surrounding portion 74 that surrounds the circumference of the port hole 122*a* of the second pressure detecting component 120. The second surrounding portion 74 is located right below the above-described first surrounding portion 64 (see FIG. 9), and includes the second side plate 53, and a second recess 75 concaved from the dividing wall 56. By providing the second recess 75 in the dividing wall 56, the port hole 122*a* of the second pressure detecting component 120 can be positioned at the center of the damper casing 50 in the widthwise direction (the center of the main scanning direction S1). The second recess 75 includes a portion of the dividing wall 56 expanded and projected toward the first-reservoir-chamber-60 side.

The return opening 73 of the second reservoir chamber 70 is in communication with an upper surface 75*a* of the second recess 75. A lower surface 75*b* of the second recess 75 is inclined downwardly from a depthwise surface 75*c* of the second recess 75 toward the second reservoir chamber 70. Depending on the type of the ink, constituents with a large specific gravity like metal constituents may be contained. Even if the ink which passes through the second recess 75 from the second reservoir chamber 70 and which flows into the return opening 73 is settled out, since the lower surface 75*b* of the second recess 75 is a surface inclined downwardly, a deposition on the lower surface 75*b* can be prevented. Accordingly, the port hole 122*a* is not clogged by the deposited ink.

As described above, as illustrated in FIG. 8, since the first recess 65 and the second recess 75 are arranged on a straight line in the vertical direction of the damper casing 50, the two pressure detecting components 110 and 120 can be arranged on a straight line in the vertical direction of the damper casing 50 at the center of the camper casing in the widthwise direction thereof (the center in the main scanning direction S1).

The description regarding the first preferred embodiment can be summarized as follows.

As illustrated in FIGS. 2 and 5, the damper apparatus 40 includes the damper casing 50, the damper films 81 and 81, and at least one pressure detecting component 110, 120. As illustrated in FIG. 2, the damper casing 50 is movable together with the ink head 14 that can discharge the ink from the nozzles 15, includes at least one reservoir chamber 60, 70 which can reserve therein the ink to be supplied to the ink head 14, and has the openings 55 and 55 in communication with the reservoir chambers 60 and 70, respectively. The damper films 81 and 81 illustrated in FIG. 5 close the openings 55 and 55, respectively, and are elastically deformable in accordance with the ink reserved amounts in the reservoir chambers 60 and 70, respectively. As illustrated in FIGS. 2 and 6, the pressure detecting components 110 and 120 are attached to the external surface of the damper casing 50 so as to be detachable, directly detect the internal pressures of the reservoir chambers 60 and 70, respectively, and generates respective detection signals.

As described above, since a structure is included which directly detects the internal pressures of the reservoir chambers 60 and 70, the adverse effects of the dimensional precisions of the reservoir chamber 60 and 70, the dimensional precisions of the components in the respective reservoir chambers 60 and 70, and an adverse effect of time-dependent change in the ink can be suppressed as much as possible. Hence, the respective pressures in the reservoir chambers 60 and 70 can be highly precisely detected. By converting, by the control unit 26 (see FIG. 2), the values of the highly precisely detected pressures into the values of the ink remaining amounts in the respective reservoir chambers 60 and 70, the damper apparatus 40 can be provided which can highly precisely detect (obtain) the ink remaining amounts in the respective reservoir chambers 60 and 70.

In addition, direct detection of the internal pressures of the respective reservoir chambers 60 and 70 of the damper apparatus 40 to decrease the pressure change in the respective ink supply systems 20 and 30 (see FIG. 2) enables a highly precise detection in comparison with a detection of the pressure at the other portion.

Moreover, as illustrated in FIGS. 6 and 8, the pressure sensing surfaces 112*a* and 122*a* of the respective pressure detecting components 110 and 120 are positioned perpendicularly to the moving direction S1 (the main scanning direction S1) of the damper casing 50.

When printing is performed on the medium Me (see FIG. 1), the damper casing 50 moves in the widthwise direction S1 of the medium Me together with the ink head 14 (see FIG. 2). At this time, a change in dynamic pressure originating from the movement of the ink in the reservoir chambers 60 and 70 may occur. However, since the pressure sensing surfaces 112*a* and 122*a* are positioned perpendicularly to the moving direction S1 of the damper casing 50, an adverse effect of such a change in the dynamic pressure is not likely to act. This enables the pressure detecting components 110 and 120 to detect stable pressure.

Furthermore, as illustrated in FIGS. 6 and 8, the pressure sensing surfaces 112*a* and 122*a* of the respective pressure detecting components 110 and 120 are positioned in parallel or substantially in parallel with the gravity direction relative to the damper casing 50.

Accordingly, an adverse effect due to settling of the pigments within the ink reserved in the respective reservoir chambers 60 and 70 (e.g., sticking of pigments to the pressure sensing surfaces 112*a* and 122*a*) can be reduced or prevented as much as possible. Moreover, although a tiny amount of air may be contained in the reservoir chambers 60 and 70, an adverse effect due to such air can be reduced or prevented as much as possible. This enables the pressure detecting components 110 and 120 to detect stable pressure.

Furthermore, as illustrated in FIGS. 3, 5, and 6, the damper apparatus 40 includes the light-blocking covers 90 and 90 that cover the damper films 81 and 81, respectively, from the external sides of the damper casing 50. The pressure detecting components 110 and 120 are attached to the damper casing 50 by the respective covers 90 and 90.

Hence, opening and closing of the covers 90 and 90 facilitate attachment and detachment of the pressure detecting components 110 and 120 to and from the damper casing 50. Since the covers 90 and 90 with a light blocking effect which cover the respective damper films 81 and 81 are effectively utilized to attach the pressure detecting components 110 and 120 to the damper casing 50, it is unnecessary to prepare an attachment component that is another component. In addition, when pressures in the respective reservoir chambers 60 and 70 increase, the covers 90 and 90 hold the respective pressure detecting components 110 and 120 so as not to be detached from the damper casing 50.

Still further, as illustrated in FIGS. 2, 5, and 8, the damper casing 50 has the interior divided into two spaces in the horizontal direction by the dividing wall 56 in a vertical plate shape, thus including the two reservoir chambers 60 and 70. The two pressure detecting components 110 and 120 capable of detecting respective internal pressures of the two reservoir chambers 60 and 70 are provided. The two pressure detecting components 110 and 120 are positioned along a straight line in the vertical direction of the damper casing 50.

As described above, by arranging the two pressure detecting components 110 and 120 on a straight line in the vertical direction relative to the two reservoir chambers 60 and 70 divided in the horizontal direction, the damper casing 50 can be downsized.

Moreover, as illustrated in FIG. 8, the two pressure detecting components 110 and 120 are mounted on the single substrate 130.

Hence, the pressure detecting components 110 and 120 can be assembled as a single unit (e.g., assembled as the single pressure detecting unit 150), and thus an assembling easiness to the damper casing 50 is enhanced.

Second Preferred Embodiment

Next, a damper apparatus 240 according to a second preferred embodiment and an image formation device 210 that includes the damper apparatus 240 will be described with reference to FIGS. 12 and 13.

Figure 12:
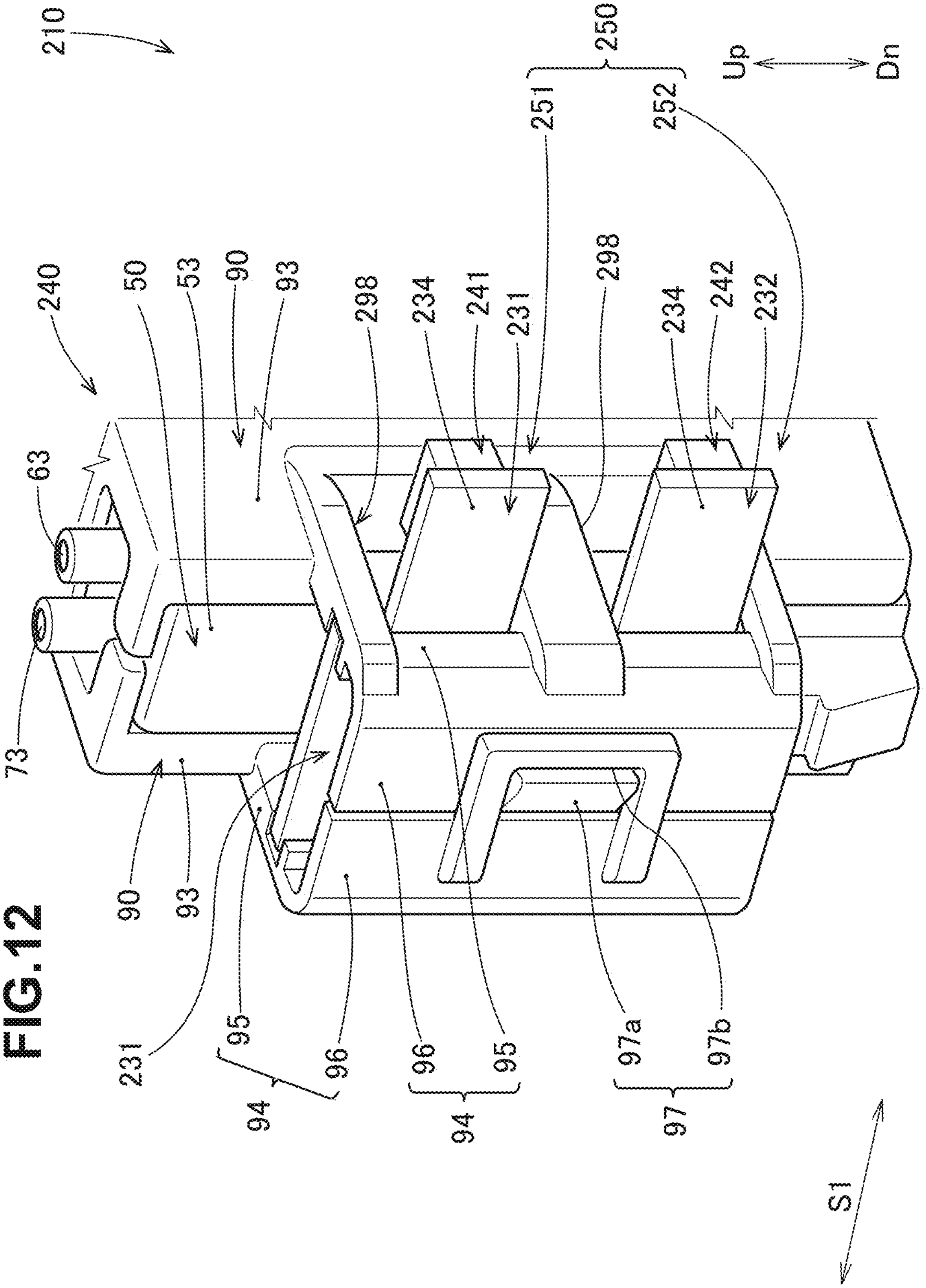
FIG. 12 is a perspective view of a damper apparatus of an image formation device according to a second preferred embodiment of the present invention in a partially omitted form as viewed from an open-end-portion side of a cover.
Figure 13:
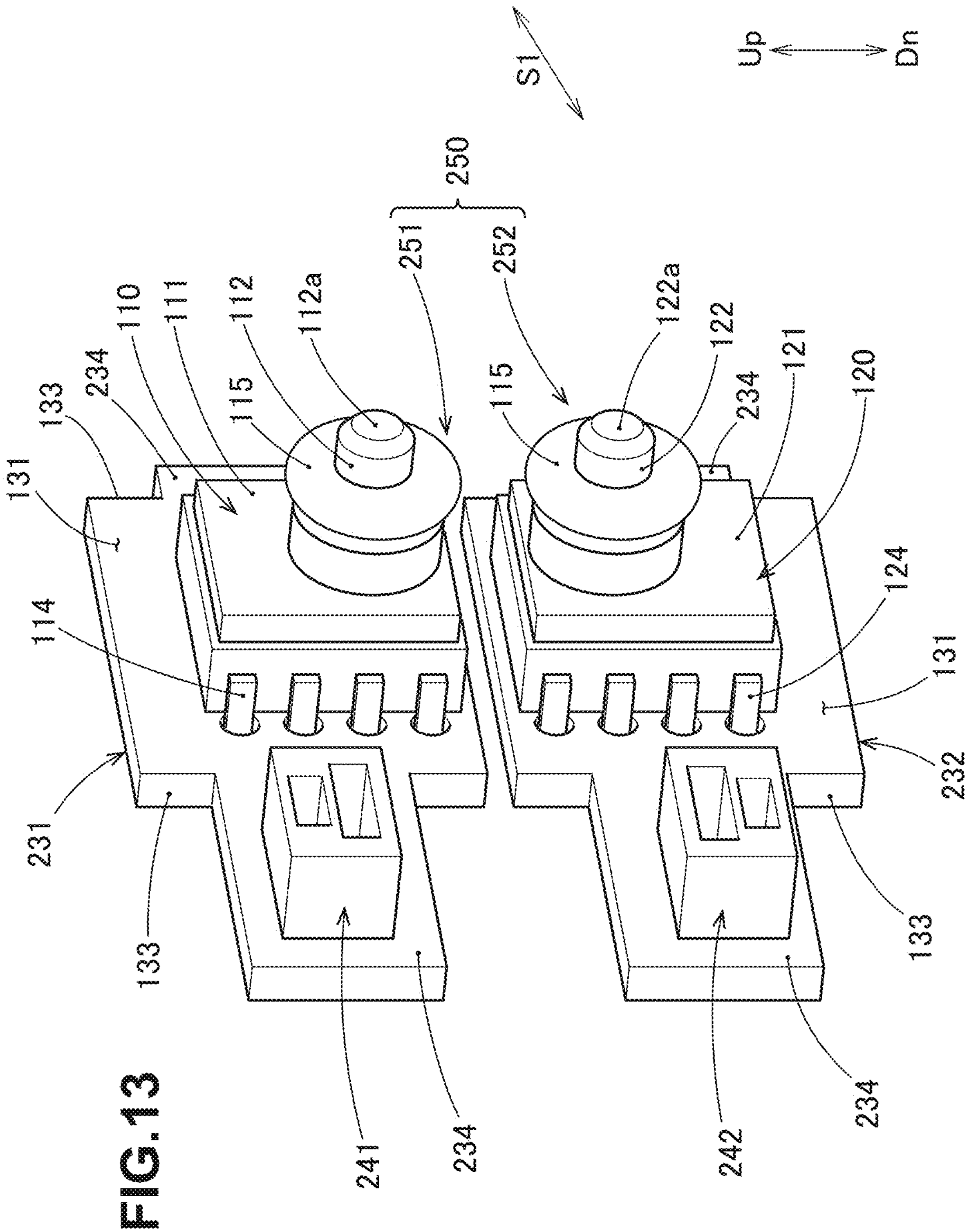
FIG. 13 is a perspective view of a pressure detecting unit illustrated in FIG. 12.

FIG. 12 is a perspective view for describing the damper apparatus 240 according to the second preferred embodiment, and corresponds to FIG. 3 for describing the damper apparatus 40 according to the first preferred embodiment. FIG. 13 is a perspective view for describing a pressure detecting unit 250 of the damper apparatus 40 according to the second preferred embodiment, and corresponds to FIG. 8 for describing the pressure detecting unit 150 of the damper apparatus 40 according to the first preferred embodiment.

The pressure detecting unit 250 according to the second preferred embodiment has a feature that can be divided into two components in the vertical direction which are a first pressure detecting unit 251 and a second pressure detecting unit 252. The other basic structures are common to those of the damper apparatus 40 according to the first preferred embodiment and those of the image formation device 10 that includes the damper apparatus 40. The common components to those of the damper apparatus 40 according to the first preferred embodiment and those of the image formation device 10 that includes the damper apparatus 40 will be denoted by the same reference numerals, and the detailed descriptions thereof will be omitted.

The first pressure detecting unit 251 includes the first pressure detecting component 110, a first substrate 231, and a first connector 241. The terminal (leads 114) of the first pressure detecting component 110 is electrically connected to the first connector 241 through the first substrate 231. Similarly, the second pressure detecting unit 252 includes the second pressure detecting component 120, a second substrate 232, and a second connector 242. The terminal (leads 124) of the second pressure detecting component 120 is electrically connected to the second connector 242 through the second substrate 232.

As described above, the two pressure detecting components 110 and 120 are mounted on the respective individual substrates 231 and 232. The substrates 231 and 232 each include two fitting protrusions 234 and 234. The respective connectors 241 and 242 are mounted on the respective fitting protrusions 234 and 234. Respective fitting recess 298 and 298 for fitting therein the respective fitting protrusions 234 and 234 are formed in the respective first extended plates 95 and 95. The fitting recesses 298 and 298 according to the second preferred embodiment include respective notch holes passing completely through the respective first extended plates 95 and 95 in the plate surface direction. Accordingly, the respective fitting protrusions 234 and 234 on which the respective connectors 241 and 242 are mounted can be easily fitted in the respective fitting recesses 298 and 298.

As is clear from the above description, according to the second preferred embodiment, the two pressure detecting components 110 and 120 are mounted on the respective individual substrates 231 and 232. Hence, in comparison with a case in which those are mounted on a single substrate, it is unnecessary to increase the precision for the pitch between the nozzles 112 and 212 of each of the pressure detecting components 110 and 210, and the precision for the pitch between the pressure detection holes 57 and 57 (see FIG. 8) of the damper casing 50, and thus a production management is facilitated. Accordingly, the productivity of the damper apparatus 240 can be enhanced.

The other actions and advantageous effects are the same as those of the damper apparatus 40 according to the first preferred embodiment and those of the image formation device 10 that includes the damper apparatus 40 illustrated in FIGS. 1 to 11.

Third Preferred Embodiment

Next, a damper apparatus 340 according to a third preferred embodiment and an image formation device 310 that includes the damper apparatus 340 will be described with reference to FIG. 14.

Figure 14:
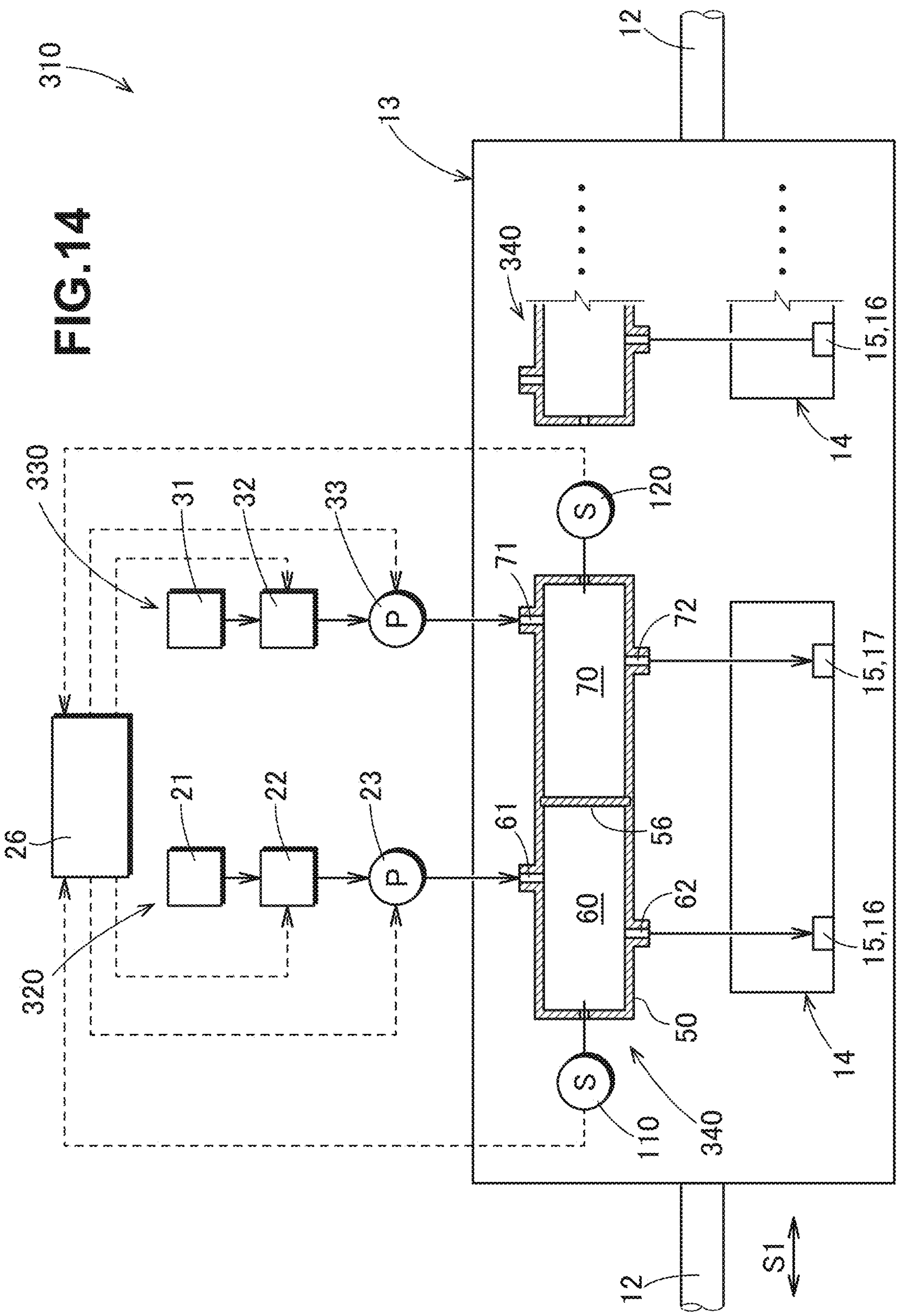
FIG. 14 is an exemplarily diagram of a carriage of an image formation device and an ink supply system according to a third preferred embodiment of the present invention.

FIG. 14 is an exemplarily diagram for describing first and second ink supply systems 320 and 330 that include the damper apparatus 340 of the third preferred embodiment, and corresponds to FIG. 2 for describing the first and second ink supply systems 20 and 30 of the above-described first preferred embodiment.

The first and second ink supply systems 320 and 330 of the third preferred embodiment have a feature that is not including the first circulation path 25 and the second circulation path 35 in comparison with the first and second ink supply systems 20 and 30 of the above-described first preferred embodiment illustrated in FIG. 2. The damper apparatus 340 of the third preferred embodiment does not include the return opening 63 of the first reservoir chamber 60 and also the return opening 73 of the second reservoir chamber 70 which are illustrated in FIG. 2.

The other basic structures are common to those of the damper apparatus 40 of the first preferred embodiment and those of the image formation device 10 that includes the damper apparatus 40. The common portions to those of the damper apparatus 40 of the first preferred embodiment and those of the image formation device 10 that includes the damper apparatus 40 will be denoted by the same reference numeral, and the detailed descriptions thereof will be omitted. Moreover, the damper apparatus 340 of the third preferred embodiment may include the structure of the damper apparatus 240 of the second preferred embodiment.

As described above, even if the first and second ink supply systems 320 and 330 does not include the first circulation path 25 and the second circulation path 35, such systems are still applicable to the damper apparatus 40 of the first preferred embodiment and the image formation device 10 thereof, and the damper apparatus 240 of the second preferred embodiment and the image formation device 210 thereof.

Note that the damper apparatuses 40, 240 and 340 according to the present disclosure and the image formation devices 10, 210 and 310 that include the respective damper apparatuses 40, 240 and 340 are not limited to the above-described preferred embodiments as far as those can be accomplish the actions and advantageous effects of the present disclosure.

The various preferred embodiments of the damper apparatuses 40, 240 and 340 according to the present disclosure and the image formation devices 10, 210 and 310 that include the respective damper apparatuses 40, 240 and 340 are suitable for ink jet-type printers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A damper apparatus comprising:

a damper casing movable together with an ink head capable of discharging an ink from a nozzle, including at least one reservoir chamber capable of reserving therein the ink to be supplied to the ink head and an opening in communication with the reservoir chamber;

a damper film to close the opening and to elastically deform in accordance with a reserved amount of the ink in the reservoir chamber; and at least one pressure detector detachably attached to an external surface of the damper casing to directly detect internal pressure of the reservoir chamber and generate a detection signal.

2. The damper apparatus according to claim 1, wherein a pressure sensing surface of the pressure detector is positioned perpendicularly or substantially perpendicularly to a moving direction of the damper casing.

3. The damper apparatus according to claim 1, wherein a pressure sensing surface of the pressure detector is positioned in parallel or substantially in parallel with a gravity direction relative to the damper casing.

4. The damper apparatus according to claim 1, further comprising a light-blocking cover that covers the damper film from an external side of the damper casing; wherein the pressure detector is attached to the damper casing by the cover.

5. The damper apparatus according to claim 1, wherein:

the damper casing includes an interior divided into two spaces in a horizontal direction by a dividing wall in a vertical plate shape so as to include the two reservoir chambers;

the two pressure detectors being operable to detect internal pressures of the two reservoir chambers, respectively; and the two pressure detectors are on a straight line in a vertical direction of the damper casing.

6. The damper apparatus according to claim 5, wherein the two pressure detectors are mounted on a single substrate.

7. The damper apparatus according to claim 5, wherein the two pressure detectors are mounted on individual substrates, respectively.

* * * * *